(12) United States Patent
Dirscherl et al.

(10) Patent No.: US 6,683,659 B2
(45) Date of Patent: Jan. 27, 2004

(54) LIQUID CRYSTAL DISPLAY SCREEN WITH BACKLIGHTING

(75) Inventors: Juergen Dirscherl, Wertheim (DE); Markus Heinrich Klein, Heerlen (NL); Hans Nikol, Eindhoven (NL); Rob Snijkers, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 92 days.

(21) Appl. No.: 09/951,865

(22) Filed: Sep. 13, 2001

(65) Prior Publication Data

US 2002/0063813 A1 May 30, 2002

(30) Foreign Application Priority Data

Sep. 14, 2000 (DE) .......................................... 100 45 407

(51) Int. Cl.[7] ............................................. G02F 1/1393
(52) U.S. Cl. ............................. 349/32; 349/66; 349/97
(58) Field of Search ............................ 349/61, 32, 97

(56) References Cited

U.S. PATENT DOCUMENTS

| | | | | |
|---|---|---|---|---|
| 4,822,144 A | | 4/1989 | Vriens | .................. 350/339 |
| 5,121,233 A | * | 6/1992 | Spencer et al. | ................ 349/69 |
| 5,543,683 A | * | 8/1996 | Haven et al. | ................ 313/461 |
| 5,666,174 A | * | 9/1997 | Cupolo, III | .................. 349/64 |
| 6,118,213 A | * | 9/2000 | Ilcisin et al. | ................ 313/582 |
| 6,246,171 B1 | * | 6/2001 | Vollkommer et al. | ....... 313/586 |
| 6,310,665 B1 | * | 10/2001 | Kido | ........................... 349/32 |

* cited by examiner

Primary Examiner—Toan Ton
Assistant Examiner—Hoan Nguyen

(57) ABSTRACT

A liquid crystal display screen comprising a liquid crystal layer and a first and a second transparent substrate flanking said liquid crystal layer, and comprising means for influencing the transmission state of the liquid crystal layer, and a phosphor layer, containing at least one phosphor in the form of phosphor dots, on the second substrate, and comprising a third substrate, which is arranged opposite the second substrate and connected with said second substrate so as to form a gastight gas discharge vessel filled with a filling gas, and comprising means for igniting and maintaining a dielectrically impeded discharge in the gas discharge vessel.

20 Claims, 1 Drawing Sheet

LIQUID CRYSTAL DISPLAY SCREEN WITH BACKLIGHTING

Figure 1:
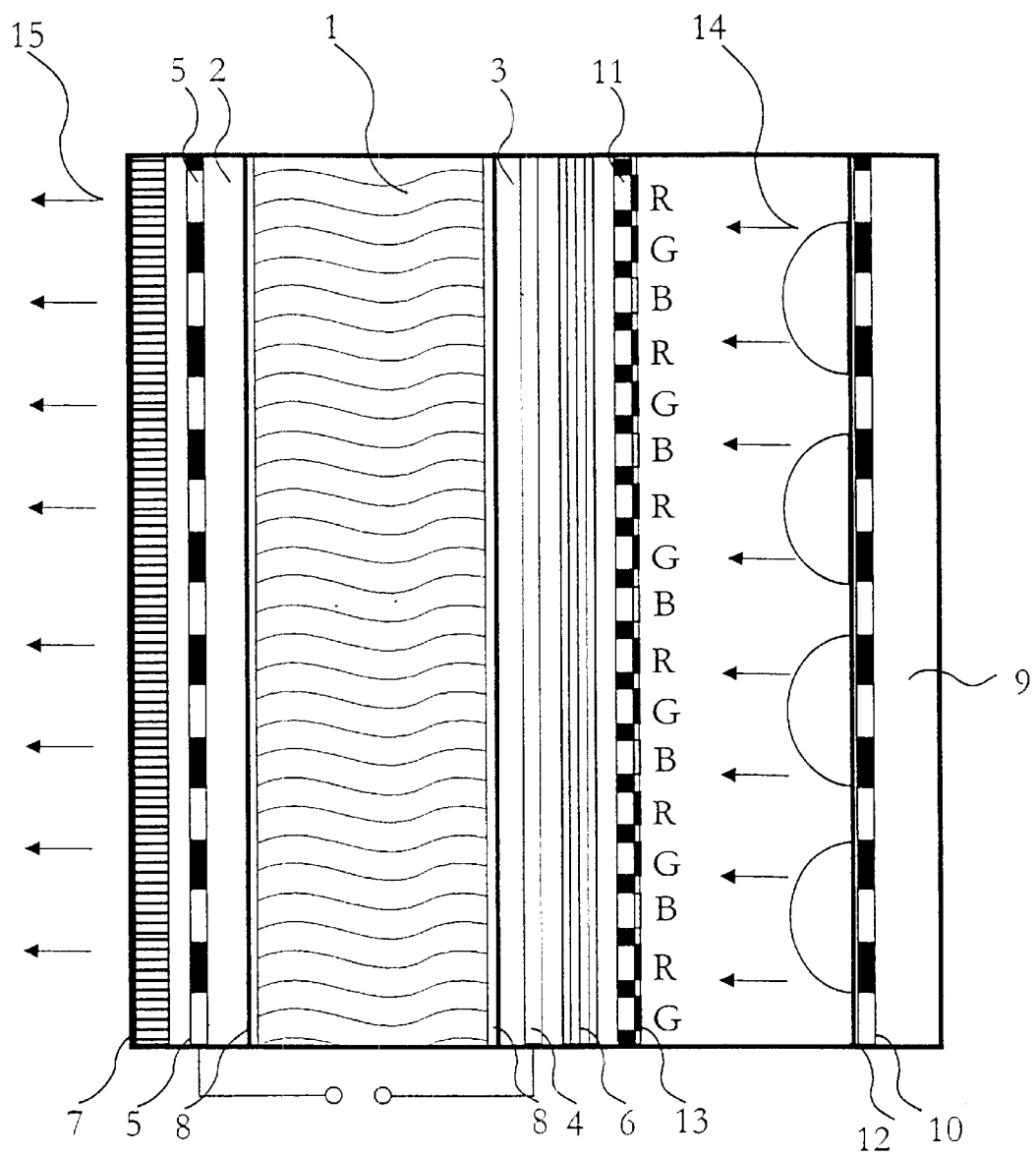

The invention relates to a liquid crystal display screen comprising a liquid crystal layer and two parallel substrates flanking said liquid crystal layer, and comprising means for influencing the transmission state of the liquid crystal layer, and a phosphor layer containing at least one phosphor, and comprising backlighting.

In liquid crystal display screens, use is made of the fact that by applying an electric field, the molecular orientation of several classes of liquid crystals can be controlled in such a manner that extraneous, incident, linearly polarized light is influenced in its direction of polarization. The different classes of liquid crystals include nematic, cholesteric and different types of smectic phases, which are each characterized by a different spatial arrangement of the molecules. For example, the widely used TN liquid crystal display screens (TN=twisted nematic) comprise nematic liquid crystals.

A conventional TN liquid crystal display screen is customarily made up of two glass plates whose inner sides are coated with a transparent electrode of indium tin oxide (ITO). A layer containing the liquid crystals is sandwiched between said glass plates. A 90° rotated edge orientation between the two glass plates is imposed on the nematic liquid crystal molecules by orientation layers situated on the glass plates. This leads to a 90° helix in the liquid crystal layer. Crossed polarizers on the outer surfaces of the glass plates and a two-dimensional backlighting complete the display screen. As long as no electric voltage is applied to the two ITO electrodes, the light originating from the backlighting, which is linearly polarized by the first polarizer, can follow the rotation through 90 degrees of the liquid crystal molecules and, subsequently, pass through the second polarizer; the display screen appears transparent. If a sufficiently high voltage is applied, the electric anisotropy of the liquid crystal molecules causes the helix to be removed and the direction of polarization remains uninfluenced; the polarized light cannot pass through the second polarizer, and the cell appears dark.

A complete picture is composed of a plurality of individual pixels, which are each driven via a matrix and function, as it were, as light valves. In colored liquid crystal display screens, a complete picture element is composed, like in CRT display screens, of three individually driven pixels for the colors red, blue and green. The color rendition in conventional liquid crystal display screens takes place by mosaic color filters which are pressed onto the front glass plate.

A drawback of the conventional liquid crystal color display screens comprising color filters resides in that the display screen can only be looked at from specific viewing angles, and external lighting is necessary, and the color saturation, luminous intensity and brightness are clearly inferior as compared to CRT display screens.

Liquid crystal color display screens comprising a phosphor layer have a higher luminous intensity and a larger angle of observation. For example, U.S. Pat. No. 4,822,144 discloses a liquid crystal color display screen which is operated in the transmission mode and based on a combination of liquid crystal switching elements and a phosphor layer, said phosphor layer being excited by a UV light source, and the brightness of the display screen being increased by an interference filter between the light source and the phosphor layer. The phosphor layer and the UV source may be situated at two remote sides of the liquid crystal switching elements. For the UV source use can be made of a mercury gas discharge lamp.

In a liquid crystal display screen where backlighting takes place using a mercury gas discharge lamp, the UV radiation generated is absorbed, however, by the material of the lamp bulb, the material of the liquid crystal layer and the substrates flanking said liquid crystal layer before said UV radiation reaches the phosphor layer.

U.S. Pat. No. 5,121,233 discloses a liquid crystal color display screen comprising a liquid crystal cell and backlighting consisting of an electron ray tube provided with a plurality of cathodes. The phosphor layer is arranged in the electron ray tube and consists of cathodoluminescent phosphors with pixels which are selectively excited.

A drawback of a liquid crystal color display screen with separate backlighting consisting of an electron ray tube with a plurality of cathodes resides in that the distance between the phosphor layer and the liquid crystal switching elements is large as compared to the lateral dimensions of the pixels. As a result, the light generated in the phosphor layer also illuminates regions beyond the intended regions, resulting in stray light being incident on the adjoining liquid crystal switching elements.

Therefore, it is an object of the invention to provide a liquid crystal display screen with improved backlighting.

In accordance with the invention, this object is achieved by a liquid crystal display screen comprising a liquid crystal layer and a first and a second transparent substrate flanking said liquid crystal layer, and comprising means for influencing the transmission state of the liquid crystal layer, and a phosphor layer, containing at least one phosphor in the form of phosphor dots, on the second substrate, and comprising a third substrate, which is arranged opposite the second substrate and connected with said second substrate so as to form a gastight gas discharge vessel filled with a filling gas, and comprising means for igniting and maintaining a dielectrically impeded discharge in the gas discharge vessel.

In this combination of a transmissive liquid crystal display screen and backlighting, liquid crystal cells and lighting are integrated into one unit. The dielectrically impeded discharges enable UV radiation of suitable wavelength to be two-dimensionally generated. Moreover, the phosphor layer can be provided in the immediate vicinity of the liquid crystal switching elements.

Instead of white light-illumination of color filters, phosphors are directly selectively excited in this liquid crystal display screen. This results in a substantially improved light output. By virtue of the compact design, this liquid crystal display screen can very suitably be used for laptops.

The service life of a backlighting with a dielectrically impeded discharge is comparable to that of UV phosphors employed for the same purpose, i.e. 50,000 hours.

Within the scope of the invention it is preferred that the distance d between the phosphor layer and the liquid crystal layer is smaller than the average radius of the phosphor dots.

Within the scope of the invention it may also be preferred that the filling gas contains an inert gas. In this embodiment, the absorption of the radiation generated by the dielectric discharge is negligibly small because there is no absorbing solid between the plasma and the phosphor layer, and the inert gas used also absorbs very little UV radiation.

It may also be preferred that the pressure of the filling gas ranges from 50 mbar to 10 bar. For this embodiment, pressure-proof containers can be dispensed with without the light output being affected.

These and other aspects of the invention will be apparent from and elucidated with reference to the embodiment(s) described hereinafter.

In the drawing:

FIG. 1 is a cross-sectional view of an embodiment of a liquid crystal display screen in accordance with the invention.

A transmissive liquid crystal display screen shown in FIG. 1 comprises a drivable liquid crystal cell. Said liquid crystal display screen also comprises backlighting by means of a dielectrically inhibited discharge. The liquid crystal cell and the backlighting are integrated so as to form a compact unit.

The liquid crystal cell comprises a liquid crystal layer 1, two parallel transparent substrates 2 and 3 by which the liquid crystal layer 1 is flanked, and means for influencing the transmission state 4 and 5 of the liquid crystal layer. The two substrates 2 and 3 jointly form the basic body of the liquid crystal cell. They are transparent to visible light. In accordance with an embodiment of the invention, both substrates may be made of glass or a transparent synthetic resin. These substrates are optically transparent, or at least translucent. The substrates are sealed at their periphery by means of a closure. The substrates and the closure enclose a space filled with the liquid crystal layer.

For the liquid crystal layer use can be made of different liquid crystal materials. For example, a "twisted nematic" material with a 90° rotation can be used for a TN-LCD, or a "supertwisted nematic" material with a rotation in the range from 180 to 270° can be used for a STN-LCD, or a birefringent material rotated through 270° ("supertwisted birefringence") can be used for a SBE-LCD. Also ferroelectric, smectic and cholesteric liquid crystal materials may be suitable.

As regards the means for influencing the transmission state of the liquid crystal layer, a distinction is made between passive matrix drive and active matrix drive. In liquid-crystal display screens with an active matrix (AM-LCD), each pixel is associated with a switch of its own, which may consist of a thin-film transistor (TFT) or a thin-film diode (TFD). Active-matrix drive also includes driving using plasma discharges in accordance with the PALC technology, which can suitably be used for the liquid crystal display screens in accordance with the invention. All in all, liquid crystal display screens with an active matrix demonstrate an improved contrast, a higher color saturation and a smaller rise time.

At present, the majority of the liquid crystal display screens produced worldwide are driven by a passive matrix. As shown in FIG. 1, the surfaces of the two substrates, which are in contact with the liquid crystal layer, are coated for this purpose with two electrode arrays of transparent, strip-shaped electrodes 4 and 5, which intersect at right angles so as to form a matrix of switching points. The electrodes may be made, for example, of ITO. The electrodes are covered with an orientation layer 8 of obliquely evaporated silicon dioxide. Furthermore, a polarizer 6 is arranged on the second substrate 3, and an analyzer 7 is arranged on the first substrate 2.

The liquid crystal display screen in accordance with the invention further comprises an integrated backlighting. Said backlighting is an incoherently emitting radiation source, which operates in accordance with the dielectrically-inhibited discharge principle.

In the simplest case, for the backlighting, a third substrate 9 is arranged behind the second substrate 3, seen in the direction of viewing. The second substrate and the third substrate are interconnected in a gastight manner. As a result, a gastight vessel is formed, which is filled with a filling gas.

On the front side, the third substrate 9 is provided with a third electrode array 10. Said third electrode array 10 comprises at least two juxtaposed electrodes, which are separated from each other and from the gas discharge space by a layer of a dielectric material. The electrodes are alternately connected to the poles of a voltage source. By virtue of the fact that the electrodes are arranged next to each other, two-dimensional discharge configurations can be obtained using comparatively flat discharge vessels.

A suitable choice of the electric wiring also enables the plasma properties of the gas discharge to be influenced. Rapid voltage increases cause the homogeneity of the plasma to be increased and hence contribute to an increase in efficiency. In certain regions (Hz-kHz), the average power input is determined by the frequency, so that the luminous power of the backlighting can be controlled by the choice of the frequency.

In the gas discharge space filled with the filling gas, the plasma is used to generate light by gas discharge. For this purpose, an alternating voltage in the range from several 100 V to 20,000 V at a frequency in the range from the industrial alternating current to several kHz is applied to the electrodes. An electric sliding discharge builds up, essentially, in the range of the dielectric surface. The gas discharge generates radiation in the UV region of the electromagnetic spectrum. The exact position of the generated wavelength range can be controlled by the type of filling gas, the gas pressure and the operating temperature.

As the filling gas for the gas discharge space wherein the plasma is ignited, use is preferably made of inert gas mixtures, in particular inert gas mixtures to which halogens are added. Particularly Xe-containing mixtures exhibit a high internal plasma efficiency of up to 70%, but also other gas mixtures containing, for example, nitrogen, oxygen, water, mercury, rare earths and halogens, may be used.

To avoid heavy pressure vessels, the gas filling pressure preferably ranges between 50 mbar and 10 bar, in particular a value around atmospheric pressure being preferred.

The second substrate 3 is provided with a phosphor layer 11, at the side facing the viewer, on the surface adjoining the liquid crystal layer or, preferably, on the surface facing the third substrate. The phosphor layer enables the color of the UV light 14 generated in the plasma discharge to be converted to visible light 15.

The materials that can suitably be used as phosphors must absorb the incoming UV radiation, emit said radiation in a suitable wavelength range, and attain a high fluorescence quantum yield. In principle, all types of phosphors that are suitable for fluorescent lamps and plasma display screens can be used. Use is preferably made of phosphors which are spectroscopically pure, i.e. which emit in the three basic colors red, green and blue and readily absorb the exciting UV wavelength. Particularly phosphors which are also used in plasma display screens can be preferably employed jointly with xenon-containing gas mixtures. Examples include: BAM ($BaMgAl_{10}O_{17}:Eu^{2+}$) for blue, LAP ($LaPO_4:Ce^{3+},Tb^{3+}$), willemite, BAL:Mn, CBT ((Ce,Gd)$MgB_5O_{10}$:Tb), BAM green ($BaMg_2Al_{16}O_{27}:Eu,Mn$) or other Tb-containing phosphors (for example $Y_2SiO_5:Tb^{3+}$) for green, and (Y,Gd)$BO_3:Eu^{3+}$, Y(V,P,B)$O_4:Eu^{3+}$ and YOX ($Y_2O_3:Eu^{3+}$) for red.

In the phosphor layer 11, the pixels can be provided in a customary manner as dots or stripes for the color triad red, green, blue.

The liquid crystal display screen can be dramatically improved by additionally using other layers having different functions.

A protective layer 12 can cover the layer of a dielectric material wherein the electrodes of the backlighting are embedded. A protective layer 12 of MgO, CaO, SrO, BaO, GdO, $MgF_2$, LiF, KCl, mixtures of these substances or other sputter-resistant materials having a high secondary electron coefficient, enables the sputter resistance to be increased and the voltage necessary for igniting to be reduced.

By means of (V)UV-reflecting or scattering layers, the UV radiation from the gas discharge space that is reverse-emitted in the direction of the electrodes can also be used. For this purpose use can be made of layers of AlonC (nanodisperse aluminum oxide), nano-$SiO_2$ or other (V)UV-scattering materials, but also of interference layers of UV-transparent materials having different refractive indices.

It may be necessary to protect UV-sensitive liquid crystal materials against UV radiation by means of a UV-absorbing layer. This may be alternatively precluded by suitably dimensioning the other layers and suitably choosing the filling gas used to influence the UV wavelength.

In order to obtain an increase of the overall efficiency, the distance between phosphor and liquid crystal layer should not be allowed to become too large. Said distance should not exceed the pixel radius. If this requirement cannot be met, or can be met only partly, additional layer structures can be provided which focus the light emitted by the phosphors in the direction of the light valve by means of, for example, microlenses.

The pixels may additionally be flanked by a black matrix 13 in order to improve the contrast and color purity.

The invention also comprises any other layer sequence of the liquid crystal layer, electrode arrays for backlighting and liquid crystal cell, polarizers and possibly color filters or black matrix, as long as the above-mentioned conditions are met and the function of the transmissive liquid crystal display screen remains in tact.

If an alternating current is fed to the electrodes of the backlighting, the voltage increases and hence the field between anode and cathode increases to a level beyond that necessary for ignition. As a result, the gas path between adjoining electrodes is punctured. The charge carriers thus generated congregate on the surfaces of the dielectric layer, as a result of which the inner electric field is attenuated such that the electron losses, such as electron caption, exceed the electron gain by ionization, so that the discharge is automatically interrupted.

The electrons generated during this discharge phase take up energy in the electric field, which energy they supply to other gas particles predominantly intermittently. In the case of a suitably chosen gas composition, these gas particles then emit light of the desired wavelength in the UV region of the electromagnetic spectrum 14.

To operate the liquid crystal cell, a voltage is applied, in accordance with the desired picture, between the two electrode arrays. In the part of the liquid crystal layer situated between turned-off switching points, the liquid crystal molecules exhibit a twisted structure with a 90° rotation across the cell. In the part of the liquid crystal layer situated between turned-on switching points, the liquid crystal molecules exhibit a non-twisted structure without, or substantially without, a rotation across the cell.

The UV radiation 14 generated by the plasma discharge is incident, in the phosphor layer, on a red, green or blue pixel. The pixels in the phosphor layer are associated with the switching points of the drive of the liquid crystal cell and aligned therewith. The phosphors excited by UV radiation then emit visible light in one of the colors red, green or blue 15. The colored, visible light traverses the polarizer, the liquid crystal medium and the analyzer at locations in the liquid crystal layer where no voltage is applied in order to light the desired image information.

What is claimed is:

1. A liquid crystal display screen comprising a liquid crystal layer and a first and a second transparent substrate flanking said liquid crystal layer, and comprising means for influencing the transmission state of the liquid crystal layer, and a phosphor layer, containing at least one phosphor in the form of phosphor dots, on the second substrate, and comprising a third substrate, which is arranged opposite the second substrate and connected with said second substrate so as to form a gastight gas discharge vessel filled with a filling gas, and comprising means for igniting and maintaining a dielectrically impeded discharge in the gas discharge vessel.

2. A liquid crystal display screen as claimed in claim 1, characterized in that the distance d between the phosphor layer and the liquid crystal layer is smaller than the average radius of the phosphor dots.

3. A liquid crystal display screen as claimed in claim 1, characterized in that the filling gas contains an inert gas.

4. A liquid crystal display screen as claimed in claim 1, characterized in that the pressure of the filling gas ranges from 50 mbar to 10 bar.

5. The liquid crystal display screen of claim 1, wherein the phosphor dots are separated and spaced apart from each other, and wherein the phosphor dots include at least a first phosphor dot adapted to emit visible light of a first color, a second phosphor dot adapted to emit visible light of a second color different from the first color, and a third phosphor dot adapted to emit visible light of a third color different from both the first and second colors.

6. The liquid crystal display screen of claim 5, wherein the first phosphor dot emits red light, the second phosphor dot emits green light, and the third phosphor dot emits blue light.

7. The liquid crystal display screen of claim 5, wherein the first phosphor dot is aligned with a first pixel of the display screen, the second phosphor dot is aligned with a second pixel of the display screen, and the third phosphor dot is aligned with a third pixel of the display screen.

8. The liquid crystal display screen of claim 1, wherein the phosphor layer is adapted to emit light in response to the discharge in the gas discharge vessel, said light passing through the liquid crystal layer to emerge from the first transparent substrate.

9. The liquid crystal display screen of claim 1, further comprising a black matrix layer disposed on the phosphor layer.

10. The liquid crystal display screen of claim 1, further comprising a polarizer disposed between the phosphor later and the second substrate.

11. A display device, comprising:

first and second substrates spaced apart and confronting each other;

a liquid crystal layer disposed between the first and second substrates;

a third substrate confronting and spaced apart from the second substrate on an opposite side of the second substrate from a side of the second substrate confronting the first substrate, said third substrate being connected with said second substrate so as to form a gastight gas discharge vessel;

a gas filling the gas discharge vessel;

means for igniting and maintaining a gas discharge in the gas discharge vessel; and a phosphor layer disposed on the second substrate, said phosphor layer being adapted to produce, in response to the gas discharge, visible light that passes through the liquid crystal layer and emerges from the first substrate.

12. The display device of claim 11, wherein a distance d between the phosphor layer and the liquid crystal layer is smaller than a radius of a pixel of the display device.

13. The display device of claim 11, wherein the gas contains an inert gas.

14. The display device of claim 11, wherein the phosphor layer comprises a plurality of phosphor dots.

15. The display device of claim 14, wherein the phosphor dots are separated and spaced apart from each other, and wherein the phosphor dots include at least a first phosphor dot adapted to emit visible light of a first color, a second phosphor dot adapted to emit visible light of a second color different from the first color, and a third phosphor dot adapted to emit visible light of a third color different from both the first and second colors.

16. The display device of claim 15, wherein the first phosphor dot emits red light, the second phosphor dot emits green light, and the third phosphor dot emits blue light.

17. The display device of claim 15, wherein the first phosphor dot is aligned with a first pixel of the display screen, the second phosphor dot is aligned with a second pixel of the display screen, and the third phosphor dot is aligned with a third pixel of the display screen.

18. The display device of claim 11, wherein the means for igniting and maintaining a gas discharge in the gas discharge vessel comprises:

a plurality of electrodes disposed on the third substrate; and a dielectric layer disposed on the plurality of electrodes.

19. The display device of claim 11, further comprising a black matrix layer disposed on the phosphor layer.

20. The display device of claim 11, further comprising a polarizer disposed between the phosphor later and the second substrate.

* * * * *